United States Patent [19]

Klauck et al.

[11] Patent Number: 4,992,500

[45] Date of Patent: Feb. 12, 1991

[54] AQUEOUS DISPERSIONS OF POLYAMIDES EMULSIFIED WITH ROSIN DERIVATIVES

[75] Inventors: Wolfgang Klauck, Meerbusch; Gerhard Gierenz, Solingen; Juergen Wichelhaus, Wuppertal, all of Fed. Rep. of Germany

[73] Assignee: Henkel Kommanditgesellschaft auf Aktien, Duesseldorf, Fed. Rep. of Germany

[21] Appl. No.: 304,995

[22] Filed: Feb. 1, 1989

[30] Foreign Application Priority Data

Feb. 5, 1988 [DE] Fed. Rep. of Germany ....... 3803524

[51] Int. Cl.$^5$ .............................................. C08L 93/04
[52] U.S. Cl. .................................. 524/270; 524/271; 524/607; 524/608
[58] Field of Search ............... 524/270, 271, 272, 606, 524/607, 608

[56] References Cited

U.S. PATENT DOCUMENTS

| | | | |
|---|---|---|---|
| 3,582,507 | 6/1971 | Peerman et al. | 260/23 |
| 3,792,002 | 2/1974 | Krieger et al. | 524/271 |
| 3,828,010 | 8/1974 | Davis et al. | 260/75 |
| 3,966,654 | 6/1976 | Aldrich | 524/270 |
| 4,177,177 | 12/1979 | Vanderhoff et al. | 260/29.2 |
| 4,263,182 | 4/1981 | Aldrich | 524/270 |
| 4,438,232 | 3/1984 | Lee | 524/272 |
| 4,714,727 | 12/1987 | Hume, III | 524/271 |

FOREIGN PATENT DOCUMENTS

| | | | |
|---|---|---|---|
| 520331 | 1/1956 | Canada | 524/270 |
| 6348 | 1/1977 | Japan | 524/271 |

*Primary Examiner*—Morton Foelak
*Assistant Examiner*—Dennis R. Daley
*Attorney, Agent, or Firm*—Ernest G. Szoke; Wayne C. Jaeschke; Norvell E. Wisdom, Jr.

[57] ABSTRACT

Aqueous dispersions of thermoplastic polyamides based on dimeric fatty acids having melting points of at least 120° C. or of mixtures of these thermoplastic polyamides, in which at least 20% of the polyamide has a melting point of at least 120° C., and which contain salts of rosin derivatives having acid values of more than 120 as emulsifiers, show excellent properties as adhesives.

20 Claims, No Drawings

AQUEOUS DISPERSIONS OF POLYAMIDES EMULSIFIED WITH ROSIN DERIVATIVES

FIELD OF THE INVENTION

This invention relates to dispersions, useful as adhesives, of polyamides in water.

DESCRIPTION OF RELATED ART

It is known that resin and polymer melts can be converted in conjunction with water and emulsifiers into so-called secondary dispersions by application of mechanical energy, for example by stirring. It is possible to start out from either a melt or from water, the other component then being slowly added. A typical representative of polymer dispersions such as these is described in U.S. Pat. No. 3,582,507. The polyamides mentioned there were obtained by condensation of polymeric fatty acids, particularly dimeric fatty acids, with diamines or alkanolamines. Homopolymers and copolymers of acrylic acid are used as emulsifier for these dispersion systems. However, these known dispersions have little or no tack and, on account of the large polyamide components, show extremely long drying times at room temperature, so that it is generally necessary, when these dispersions are used as adhesives, first to remove the water from the dispersion by heating. U.S. Pat. No. 3,828,010 describes polyester amides dispersible in water. U.S. Pat. No. 4,177,177 describes emulsions of polyamides of oleic acid and ethylenediamine.

One feature common to all the polymer dispersions mentioned above is that, although they are applied to substrate surfaces from an aqueous dispersion, they have first to be freed from the water present in the dispersion before they can be practically used as an adhesive in the form of a hot melt.

An object of the present invention is to provide very finely divided dispersions of polyamides that may be used as contact adhesives, even at room temperature, both by the wet bonding technique and also after a suitable drying period.

DESCRIPTION OF THE INVENTION

Except in the operating and comparative examples, or where otherwise explicitly stated, all numbers used in the description herein to specify quantities of materials used or reaction conditions are to be understood as if modified by the word "about".

The aqueous dispersions of the invention contain thermoplastic polyamide, of which at least 20 parts by weight has a melting points of at least 120° C. This polyamide component is emulsified with rosin derivatives having an average acid value of at least 120 (for rosin derivatives that are salts, the acid value is measured on the corresponding acid). For an arbitrary 100 parts of polyamide, the dispersions according to this invention contain from 1 to 250 parts by weight of rosin derivatives, of which at least 1 part by weight are salts, and at least 40 parts by weight of water Excellent bonding results may be obtained with the aqueous dispersions according to the invention. The films obtained after drying can be, for example, thermally reactivated so as to bond at elevated temperatures, although these temperatures are distinctly lower than the melting points of the polyamides. In addition, these reactivation bonding temperatures may be varied over a wide range by varying the concentration of rosin derivatives to be used in accordance with the invention.

The aqueous dispersions according to the invention may be prepared by initially introducing all the components into a stirred vessel and vigorously mixing them after heating above the melting point of the polyamides. Finely divided dispersions ranging in appearance from milky white to gel-like and transparent are obtained. They can be prepared with solids contents of more than 60%, although they show maximum stability in storage at solids contents of 30 to 45%. The dispersions according to the operating examples are stable in storage for at least 6 months at room temperature.

Depending on their composition, the dispersions according to the invention can show strong surface tack, which is developed in particular during the drying step. Wood-to-wood and composite plastic-to-metal bonds made with the adhesives according to the invention are characterized by high tensile shear strengths. In addition, metal surfaces can also be bonded without deoiling them. Waterproof films, which can be used as protective surface films, can be obtained from the adhesives after drying, as a result of the minimal water uptake of the polyamides present in the aqueous dispersions according to the invention.

In one advantageous embodiment of the invention, the aqueous dispersions contain rosin derivatives from the group consisting of (a) natural rosin containing more than 70% by weight resinic acids and having an acid value of more than 120 and preferably from 150 to 170, (b) disproportionated rosin having an acid value of more than 120 and preferably from 140 to 170, (c) hydrogenated rosin having an acid value of more than 120 and preferably from 145 to 170, (d) dimerized or polymerized rosin having an acid value of more than 120 and preferably from 145 to 170, and (e) salts of any of these acidic derivatives. Rosin derivatives of all the types noted above are commercially available.

In an advantageous embodiment of the invention, the aqueous dispersions contain emulsifiers and polyamides in ratios by weight to one another of from 70:30 to 20:80 and preferably from 55:45 to 25:75. The preferred total content of emulsifiers and polyamides in the dispersions is from 20 to 60% by weight and more preferably from 30 to 45% by weight, when the dispersions are to be used as adhesives. With a total solids content below 20% by weight, the dispersions may also be used as primers.

In industrial application of dispersions according to the invention, the emulsifier content, based on polyamides, may be lower, between 1 and 20% by weight.

The polyamides present in the aqueous dispersions according to the invention preferably have melting or softening points in the range from 120 to 200° C. Where mixtures of several polyamides are used, it is sufficient for one polyamide to have a melting point of at least 120° C.; the other polyamides may have melting points or softening points below 100° C.

The thermoplastic polyamides to be used in the aqueous dispersions according to the invention are prepared by condensation of dimeric fatty acids and diamines and/or aminoalcohols in the usual way known in the polymerization art, optionally in the presence of mono- or dicarboxylic acids. They are advantageously prepared from dimerized fatty acids, preferably oleic acid, in the form of technical mixtures thereof, such as are obtainable from fats of animal and/or vegetable or of synthetic origin, or lower alkyl esters of such acids, and suitable amines. From their production, dimeric fatty acids contain varying quantities of monomeric and/or trimeric fatty acids. It is preferred to use technical mixtures of dimeric fatty acids, more especially dimeric oleic acid, which contain at least 70% by weight dimers, at most 15% by weight and more preferably at most 10% by weight trimers and up to 5% by weight monomers.

In another advantageous embodiment of the invention, the aqueous dispersions contain polyamides prepared from (a) 20 to 50 mole % dimeric fatty acids, (b) 0 to 25 mole % dicarboxylic acids containing 6 to 20 carbon atoms and (c) 20 to 55 mole % diamines corresponding to the formula $H_2N-R-NH_2$, in which R is an aliphatic, alicyclic or optionally alkyl-substituted aromatic radical containing 2 to 8 carbon atoms, such diamines being partially replaceable by alkanolamines corresponding to the formula $H_2N-R'-OH$, in which R' is a straight-chain or branched alkylene radical containing 2 to 8 carbon atoms.

In one advantageous embodiment of the invention, the aqueous dispersions contain polyamides prepared from (a)35 to 49.5 mole % dimeric fatty acids, (b) 0.5 to 15 mole % monomeric fatty acids containing 6 to 22 carbon atoms, and (c) 2 to 35 mole % polyether diamines corresponding to the general formula $H_2N-R^1-O-(RO)_x-R^2-NH_2$, in which x is a number of from 8 to 80, preferably from 8 to 40, $R^1$ and $R^2$ may be the same or different and each represents aliphatic and-/or cycloaliphatic hydrocarbon radicals, and R is a straight or branched aliphatic hydrocarbon radical containing 1 to 6 carbon atoms, (d) 15 to 48 mole % aliphatic diamines containing 2 to 40 carbon atoms in the carbon chain, and, optionally, (e) 2 to 14 mole % aliphatic dicarboxylic acids containing 4 to 10 carbon atoms in the molecule.

Particularly preferred polyamides are those prepared from (a) 35 to 49.5 mole % dimeric fatty acids, (b) 0.5 to 15 mole % monomeric fatty acids containing 6 to 22 and more preferably 16 to 18 carbon atoms, (c) 4 to 10 mole % polyether diamines, and (d) 40 to 46 mole % aliphatic diamines, and, optionally, (e) 2 to 14 mole % aliphatic dicarboxylic acids containing 4 to 10 carbon atoms in the molecule. It is still more preferable if the polyamides are prepared from (a) dimeric fatty acids having a dimer content above 70%, (b) 2 to 10% by weight, based on dimeric fatty acids, of monomeric fatty acids containing 16 to 18 carbon atoms, (c) bis-(3-aminopropyl)-polytetrahydrofuran having a number average molecular weight of 700 to 1500 and/or bis-(3-aminopropyl)-polyoxypropylene having a number average molecular weight of 1200 to 2500, and d) diaminoethane, 1,3-diaminopropane, 1,4-diaminobutane and/or dimeric amines having the carbon chain of dimeric fatty acids.

In another advantageous embodiment of the invention, the aqueous dispersions contain polyamides prepared from (a) 25 to 50 mole % dimeric fatty acids optionally containing up to 10 mole % and preferably up to 5 mole %, based on dimeric fatty acids, of trimeric fatty acids, (b) up to 25 mole % aliphatic dicarboxylic acids, containing 6 to 22 carbon atoms, (c) 20 to 55 mole % aliphatic, aromatic and/or cyclic diamines containing 2 to 40 carbon atoms from the group of diprimary diamines, diamines containing secondary amino groups and bearing alkyl substituents with no more than 8 carbon atoms at the nitrogen atom and/or heterocyclic diamines capable of double amide formation and, optionally, (d) 5 to 25 mole % aliphatic diamines having 2 to 10 carbon atoms separating the two amino nitrogen atoms, these diamines being N-alkyl-substituted on at least one side and being capable of double amide formation, with 10 to 25 carbon atoms in the linear or branched N-alkyl radical.

Mixtures of the various polyamides mentioned above may also be used in the aqueous dispersions according to the invention. Polyamides based on dimeric fatty acids having softening points below 120° C. may also be used providing one or more polyamides based on dimeric fatty acids having softening points of at least 120° C. are added at the same time, in which case the proportion of polyamides with the higher melting point is preferably at least about 20% by weight, based on the lower-melting polyamides.

Preferably, the polyamides used in compositions according to the invention have acid values of 1 to 30 and amine values of 0.1 to 35.

The inorganic and/or organic bases useful in forming the aqueous dispersions according to the invention form salts with the rosin derivatives to be used in accordance with the invention. Inorganic bases from the group consisting of hydroxides and carbonates of lithium, sodium and potassium and/or organic bases from the group consisting of hydrazine, ethanolamine, diethanolamine, triethanolamine, morpholine, diaminoethane and 2,6-lutidine are preferably used.

At least 1%, based on the solids content of the dispersion, of rosin constituents saponified by the bases added must be present for the preparation of the aqueous dispersions according to the invention. With higher emulsifier contents, 0 to 100% of the excess rosin constituents above 1% may be saponified. For example, if rosin constituents are present to the extent of 40% of the total solids of the dispersion, up to 39% of the rosin constituents could be left unsaponified. The particle fineness of the dispersions and the thermal stability of the adhesive bonds formed when using dispersions according to the invention as adhesives increase with increasing degree of saponification of the rosin constituents present.

The aqueous dispersions according to the invention may additionally contain plasticizers poorly soluble in water, particularly propoxylated fatty acids, and also waxes, stabilizers, pigments and/or fillers and other typical additives familiar to an experienced adhesive formulator.

The present invention also encompasses the use of the claimed aqueous dispersions as adhesives or coating compositions.

Some preferred embodiments of the invention are described in detail in the following operating examples, which are intended to illustrate the invention without necessarily limiting it in any way.

Preparation of Typical Representatives of Polyamides Suitable for Use in Accordance with the Invention General procedure for the preparation of polyamides The condensation reaction was carried out with stirring under a nitrogen atmosphere in a glass flask. The carboxylic acids, introduced into the flask first, were heated to around 60° C., after which the other reaction components were added. The reaction mixture was then heated for 1 hour to 230° C. and left at that temperature for 1 hour. The glass flask was then evacuated to 15 mbar pressure at a constant temperature over the next hour. After cooling to 120° C. the reaction product was drained off and isolated for property determination or for subsequent use. Using this procedure, polyamides were made from the components shown below.

Polyamide A

| Component | % by weight |
|---|---|
| Dimeric fatty acid based on oleic acid (with monomer content 1% by weight, trimer content 4% by weight) | 28.1 |
| Azelaic acid | 22.3 |
| Ethylenediamine | 12.4 |
| Piperazine | 37.2 |
| | 100.0 |

Polyamide A had the following characteristics:
Softening point approx. 138° C.
Acid value approx. 8.0
Amine value approx. 0.1

Polyamide B

| Component | % by weight |
|---|---|
| Dimeric fatty acid based on oleic acid (with monomer content 1% by weight, trimer content 4% by weight) | 74.9 |
| Stearic acid | 5.6 |
| Diaminoethane | 7.8 |
| Bis-(3-aminopropyl)-polytetrahydro-furan (MW 1100) | 11.7 |
| | 100.0 |

Polyamide B had the following characteristics:
Softening point approx. 155° C.
Acid value 7.6
Amine value 1.0

Polyamide C

| Component | % by weight |
|---|---|
| Dimeric fatty acid based on oleic acid (with monomer content 1% by weight, trimer content 4% by weight) | 76.4 |
| Azelaic acid | 5.2 |
| Ethylenediamine | 7.6 |
| N-alkyl propylenediamine (alkyl radicals correspond to all oil fatty acid in chain length and distribution) | 10.8 |
| | 100.0 |

Polyamide C had the following characteristics:
Softenng point 140° C.
Acid value 0.1
Amine value 3.2

Polyamide D

| Component | % by weight |
|---|---|
| Dimeric fatty acid based on oleic acid (with monomer content 1% by weight, trimer content 4% by weight) | 41.0 |
| Azelaic acid | 9.0 |
| Ethylenediamine | 50.0 |
| | 100.0 |

Polyamide D had the following characteristics:
Softening point 165° C.
Acid value 0.1
Amine value 3.1

Polyamide E

This was a mixture of 90 parts by weight of Polyamide A as described above with a plasticizer of sulfonamide resin, having molecular weight 199, solidification point 0° C., acid value 0.40 mg KOH/g, viscosity at 25° C. of 360 centiStokes).

Polyamide E had the following characteristics:
Softening point 120° C.
Acid value 8.0
Amine value 0.1

Polyamide F

| Component | % by weight |
|---|---|
| Dimeric fatty acid based on oleic acid (with monomer content 1% by weight, trimer content 4% by weight) | 83.2 |
| Ethylenediamine | 7.0 |
| N-alkyl propylenediamine (alkyl radical corresponds to tall oil fatty acid in chain length and distribution) | 9.8 |
| | 100.0 |

Polyamide F had the following characteristics:
Softening point 100° C.
Acid value 0.1
Amine value 4.1

General Procedure for the Preparation of Aqueous Dispersions According to the Invention The polyamides, rosin derivatives, bases and water are initially introduced into a pressure vessel and vigorously stirred for 10 minutes at a temperature 10° C. above the melting point of the polyamide.

Typical representatives of commercially available rosin derivatives suitable for use in accordance with the invention are shown below.

Rosin derivative A - Hydrogenated rosin having the following characteristics:
Acid value approx. 165
Saponification value approx. 167
Refractive index (100° C.) 1.5008
Density (20° C.) 1.045
Softening point approx. 75° C.

Rosin derivative B - Disproportionated rosin having the following characteristics:
Acid value approx. 155 to 170
Softening point 65 to 68° C.

Examples of aqueous dispersions according to the invention (Examples 1 to 5 and 7 to 12) are shown in Table I below. The polyamides and emulsifiers (rosin derivatives) used are identified by the letters used above. Finely divided dispersions were obtained in every case apart from Example 6 which is not within the scope of the invention. Polyamide F which has a softening point below 120° C. was used in Example 6; it does not give a dispersion. However, dispersions containing polyamide F can be prepared by using it together with another polyamide having a softening point of at least 120° C., as shown in Examples 11 and 12.

Test specimens measuring 5×10×0.5 cm were sued to determined the tensile shear strengths of the bonds obtained using the aqueous dispersions according to the invention as described above; the overlap length was 2 cm. The test specimens (apart from wood) were lightly roughened, held together with clothes pins for 6 days at room temperature after bonding, and then tested. The tensile shear strengths achieved are shown in Table II below, each entry in the table representing average values from 6 measurements.

TABLE I

Constituents of Some Example Dispersions According to the Invention and of a Comparative Example

| Example Number | Polyamide (quantity, g) | Emulsifier (quantity, g) | Base (quantity, g) | Water Grams |
|---|---|---|---|---|
| 1 | A(200) | A(130) | LiOH(5.5) | 400 |
| 2 | B(200) | A(130) | NaOH(7) | 400 |
| 3 | C(200) | B(120) | KOH(10) | 400 |
| 4 | D(200) | A(140) | NaOH(10) | 400 |
| 5 | E(200) | B(130) | NaOH(10) | 400 |
| 6 | F(200) | B(130) | NaOH(10) | 400 |
| 7 | A(200) | A(20) | NaOH(2.2) | 300 |
| 8 | A(200) | A(400) | NaOH(20) | 600 |
| 9 | A(200) | A(130) | EA[1](17) | 400 |
| 10 | A(100) D(100) | A(130) | NaOH(10) | 350 |
| 11 | A(120) F(80) | A(130) | NaOH(10) | 400 |
| 12 | A(100) F(100) | B(130) | NaOH(10) | 400 |

[1]Ethanolamine

TABLE II

| Materials Bonded | Tensile shear strengths (in N/mm$^2$) Adhesive from Example Number | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| Wood/wood | 8.0 | 7.0 | 6.8 | 7.2 | 6.1 | — | 3.0 | 1.2 | 7.8 | 8.0 | 6.5 | 6.8 |
| Wood/PVC | 4.6 | 3.9 | 3.8 | 4.0 | 4.7 | — | 2.0 | 1.0 | 4.2 | 4.5 | 3.5 | 3.2 |
| Wood/ABS | 4.0 | 3.8 | 3.7 | 3.9 | 3.5 | — | 1.5 | 1.0 | 4.4 | 4.1 | 3.3 | 3.6 |
| Wood/ALU | 7.6 | 4.8 | 3.6 | 6.0 | 4.8 | — | 1.3 | 1.1 | 6.0 | 6.5 | 5.3 | 4.9 |
| Wood/FE | 8.9 | 7.0 | 5.0 | 6.1 | 5.2 | — | 1.5 | 1.0 | 6.0 | 7.6 | 5.6 | 4.9 |

Notes for TABLE II:
"PVC" means rigid poly(vinyl chloride);
"ABS" means elastomeric acrylonitrile-butadiene-styrene copolymer;
"ALU" means aluminum;
and "FE" means carbon steel.

What is claimed is:

1. An aqueous dispersion of polyamides in water emulsified with rosin derivatives, said dispersion comprising:
   (a) 100 parts by weight of thermoplastic polyamide, of which at least 20 parts by weight has a melting points of at least 120° C.;
   (b) from about 1 to about 250 parts by weight of rosin derivatives having an average acid value of at least about 120, of which rosin derivatives at least about 1 part by weight are salts; and
   (c) at least about 40 parts by weight of water.

2. An aqueous dispersion according to claim 1, wherein the rosin derivatives are selected from the group consisting of (i) natural rosin containing more than 70% by weight resinic acids and having an acid value of from about 150 to about 170, (ii) disproportionated rosin having an acid value of from about 140 to about 170, (iii) hydrogenated rosin having an acid value of from about 145 to about 170, (iv) dimerized or polymerized rosin having an acid value of from about 145 to about 170, and (v) salts of any of the above noted rosin derivatives.

3. An aqueous dispersion according to claim 2, wherein the rosin derivatives and polyamides are present in a ratio by weight to one another of from about 70:30 to about 20:80.

4. An aqueous dispersion according to claims 3, characterized by a total content of emulsifiers and polyamides of from about 20 to about 60% by weight.

5. An aqueous dispersion according to claim 4, wherein substantially all of the polyamides have melting points between about 120 and about 200° C.

6. An aqueous dispersion according to claim 5, wherein the polyamide component has a composition that could be achieved by polymerizing, as the acidic component, dimerized naturally derived oleic acid having a dimer content of at least about 70% by weight, a trimer content of at most 15% by weight, and a monomer content of at most 5% by weight.

7. An aqueous dispersion according to claim 6, wherein the polyamides have a structure that could be achieved by being prepared from (i) about 20 to about 50 mole % dimeric fatty acids, (ii) up to about 25 mole % dicarboxylic acids containing 6 to 20 carbon atoms and (iii) from about 20 to about 55 mole % of materials selected from the group consisting of (A) diamines corresponding to the formula $H_2N-R-NH_2$,
   in which R is an aliphatic, alicyclic or optionally alkyl-substituted aromatic radical containing 2 to 8 carbon atoms and (B) alkanolamines corresponding to the formula $H_2N-R'-OH$, in which R' is a straight-chain or branched alkylene radical containing 2 to 8 carbon atoms, with at least some of the material being selected from option (A).

8. An aqueous dispersion according to claim 6, wherein the polyamide components have structures that could be achieved by being prepared from (i) about 35 to about 49.5 mole % dimeric fatty acids, (ii) about 0.5 to about 15 mole % monomeric fatty acids containing 4 to 22 carbon atoms, and (iii) about 2 to about 35 mole % polyether diamines corresponding to the formula $H_2N-R^1-O-(RO)_x-R^2-NH_2$, in which x is a number of from 8 to 80, $R^1$ and $R^2$ may be the same or different and each represents an aliphatic or cycloaliphatic hydrocarbon radical, and R is a straight or branched aliphatic hydrocarbon radical containing 1 to 6 carbon atoms, and (iv) 15 to 48 mole % aliphatic diamines containing 2 to 40 carbon atoms in the carbon chain.

9. An aqueous dispersion according to claim 8, wherein the polyamide components has a structure that could be achieved by being prepared from (i) about 35 to about 49.5 mole % dimeric fatty acids, (ii) about 0.5 to about 15 mole % monomeric fatty acids containing 6 to 22 carbon atoms, (iii) about 4 to about 10 mole % polyether diamines, and (iv) about 40 to about 46 mole % aliphatic diamines.

10. An aqueous dispersion according to claim 6, wherein the polyamides have a structure that could be achieved by being prepared from (i) dimeric fatty acids having a dimer content about 70%, (ii) about 2 to about 10% by weight, based on the dimeric fatty acids, of monomeric fatty acids containing 16 to 18 carbon atoms, (iii) (A) bis-(3-aminopropyl)-polytetrahydrofuran having a number average molecular weight of 700 to 1500, (B) bis-(3-aminopropyl)-polyoxypropylene having a number average molecular weight of 1200 to 2500, or (C) a mixture of (A) and (B), and (iv) diaminoethane, 1,3-diaminopropane, 1,4-diaminobutane, dimer amines having the carbon chain or dimeric fatty acids, or mixtures of any of these types of diamines.

11. An aqueous dispersion according to claim 6, wherein the polyamides have a structure that would result from being prepared from (i) from about 25 to about 80 mole % of combined (A) dimeric fatty acids, (B) trimeric fatty acids, and (C) aliphatic dicarboxylic acids having about 6 to about 22 carbon atoms, with no more than about 10 mole % of trimeric fatty acids and no more than about 25 mole % of aliphatic dicarboxylic acids, (iii) about 20 to about 55 mole % combined aliphatic, aromatic, and cyclic diamines, each containing from 2 to about 40 carbon atoms and selected from the group consisting of (A) diprimary diamines, (B) diamines containing secondary amino groups and bearing alkyl substituents wit no more than about 8 carbon atoms at the nitrogen atom, (C) heterocyclic diamines capable of double amide formation, and (D) aliphatic diamines containing from about 2 to about 10 carbon atoms between the two amino nitrogen atoms and also N-alkyl-substituted on at least one side with an alkyl radical containing from about 10 to about 25 carbon atoms and which are capable of double amide formation, with type (D) constituting not more than about 25 mole % of the total of the entire mixture of monomers.

12. An aqueous dispersion according to claim 1, wherein the polyamides have acid values between about 1 and about 30 and amine values between about 0.1 and about 3.5.

13. An aqueous dispersion according to claim 12, wherein at least about 1 part by weight of the rosin derivatives are salts with bases selected from the group consisting of (i) hydroxides and carbonates of lithium, sodium, and potassium, (ii) hydrazine, (iii) ethanolamine, (iv) diethanolamine, (iv) triethanolamine, (v) morpholine, (vi) diaminoethane, and (vii) 2,6-lutidine.

14. An aqueous dispersion according to claim 11, wherein at least about 1 part by weight of the rosin derivatives are salts with bases selected from the group consisting of (i) hydroxides and carbonates of lithium, sodium, and potassium, (ii) hydrazine, (iii) ethanolamine, (iv) diethanolamine, (iv) triethanolamine, (v) morpholine, (vi) diaminoethane, and (vii) 2,6-lutidine.

15. An aqueous dispersion according to claim 11, wherein at least about 1 part by weight of the rosin derivatives are salts with bases selected from the group consisting of (i) hydroxides and carbonates of lithium, sodium, and potassium, (ii) hydrazine, (iii) ethanolamine, (iv) diethanolamine, (iv) triethanolamine, (v) morpholine, (vi) diaminoethane, and (vii) 2,6-lutidine.

16. An aqueous dispersion according to claim 10, where at least about 1 part by weight of the rosin derivatives are salts with bases selected from the group consisting of (i) hydroxides and carbonates of lithium, sodium, and potassium, (ii) hydrazine, (iii) ethanolamine, (iv) diethanolamine, (iv) triethanolamine, (v) morpholine, (vi) diaminoethane, and (vii) 2,6-lutidine.

17. An aqueous dispersion according to claim 9, wherein at least about 1 part by weight of the rosin derivatives are salts with bases selected from the group consisting of (i) hydroxides and carbonates of lithium, sodium, and potassium, (ii) hydrazine, (iii) ethanolamine, (iv) diethanolamine, (iv) triethanolamine, (v) morpholine, (vi) diaminoethane, and (vii) 2,6-lutadine.

18. An aqueous dispersion according to claim 7, wherein at least about 1 part by weight of the rosin derivatives are salts with bases selected from the group consisting of (i) hydroxides and carbonates of lithium, sodium, and potassium, (ii) hydrazine, (iii) ethanolamine, (iv) diethanolamine, (iv) triethanolamine, (v) morpholine, (vi) diaminoethane, and (vii) 2,6-lutidine.

19. An aqueous dispersion according to claim 2, wherein at least about 1 part by weight of the rosin derivatives are salts with bases selected from the group consisting of (i) hydroxides and carbonates of lithium, sodium, and potasssium, (ii) hydrazine, (iii) ethanolamine, (iv) diethanolamine, (iv) triethanolamine, (v) morpholine, (vi) diaminoethane, and (vii) 2,6-lutidine.

20. An aqueous dispersion according to claim 1, wherein at least about 1 part by weight of the rosin derivatives are salts with bases selected from the group consisting of (i) hydroxides and carbonates of lithium, sodium, and potassium, (ii) hydrazine, (iii) ethanolamine, (iv) diethanolamine, (iv) triethanolamine, (v) morpholine, (vi) diaminoethane, and (vii) 2,6-lutidine.

* * * * *

UNITED STATES PATENT AND TRADEMARK OFFICE
CERTIFICATE OF CORRECTION

PATENT NO. : 4,992,500

DATED : February 12, 1991

INVENTOR(S) : Klauck et al.

It is certified that error appears in the above-identified patent and that said Letters Patent is hereby corrected as shown below:

At Claim 9, Column 8, line 19, "components" should read --component--.

At Claim 11, Column 8, line 53, "wit" should read --with--.

At Claim 12, Column 8, line 66, "3.5" should read --35--.

At Claim 17, Column 10, line 5, "lutadine" should read --lutidine--.

Signed and Sealed this

Twenty-first Day of July, 1992

*Attest:*

DOUGLAS B. COMER

*Attesting Officer*     Acting Commissioner of Patents and Trademarks